US011195242B1

(12) United States Patent
Wiatrek et al.

(10) Patent No.: US 11,195,242 B1
(45) Date of Patent: Dec. 7, 2021

(54) SYSTEMS AND METHODS FOR ANONYMIZING TRANSACTION INFORMATION

(71) Applicant: United Services Automobile Association (USAA), San Antonio, TX (US)

(72) Inventors: Nathaniel Brett Wiatrek, San Antonio, TX (US); Nathan Ryan Johnson, Celina, TX (US); Julia Beatrice Isaac, Plano, TX (US); Joshua Dowdy, Arlington, WA (US); Angela Dorothea Bowen, San Antonio, TX (US); Jasmine Minjeong Jeong, San Antonio, TX (US); Oscar Roberto Tijerina, San Antonio, TX (US); Kevin Anthony Kossow, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/801,662

(22) Filed: Feb. 26, 2020

Related U.S. Application Data

(60) Provisional application No. 62/811,394, filed on Feb. 27, 2019.

(51) Int. Cl.
*G06Q 50/26* (2012.01)
*G06Q 30/02* (2012.01)
(Continued)

(52) U.S. Cl.
CPC ....... *G06Q 50/265* (2013.01); *G06F 16/2379* (2019.01); *G06F 21/6245* (2013.01); *G06K 19/06028* (2013.01); *G06K 19/06037* (2013.01); *G06Q 30/0236* (2013.01); *G06Q 40/08* (2013.01); *H04L 63/0421* (2013.01); *H04L 63/08* (2013.01)

(58) Field of Classification Search
CPC .............. G06Q 50/265; G06F 16/2379; G06F 21/6245; H04L 63/0421
See application file for complete search history.

(56) References Cited

U.S. PATENT DOCUMENTS 5,636,292 A * 6/1997 Rhoads ................... G07F 17/16
382/232
9,665,865 B1 * 5/2017 Xing ................... G06Q 20/3276
(Continued)

FOREIGN PATENT DOCUMENTS

WO WO-2016000015 A1 * 1/2016 ......... G06F 21/6218

*Primary Examiner* — Scott C Anderson
(74) *Attorney, Agent, or Firm* — Fletcher Yoder P.C.

(57) ABSTRACT

A system may include a first computing system that may include at least one processor. The at least one processor may receive a request for identification information associated with a user of the first computing device, such that the request is received from a second computing device. The at least one processor may then receive information regarding an entity associated with the second computing device, retrieve data comprising the identification information from a storage component, generate additional data comprising a portion of the identification information based on the information regarding the entity, and send the additional data to the second computing device.

20 Claims, 3 Drawing Sheets

(51) Int. Cl.
*G06Q 40/08* (2012.01)
*H04L 29/06* (2006.01)
*G06K 19/06* (2006.01)
*G06F 21/62* (2013.01)
*G06F 16/23* (2019.01)

(56) References Cited

U.S. PATENT DOCUMENTS

| | | | |
|---|---|---|---|
| 2012/0253852 A1* | 10/2012 | Pourfallah | G06Q 20/405 |
| | | | 705/4 |
| 2014/0348395 A1* | 11/2014 | Pollard | G06K 9/00442 |
| | | | 382/112 |
| 2015/0012305 A1* | 1/2015 | Truskovsky | G06Q 10/02 |
| | | | 705/5 |
| 2015/0248663 A1* | 9/2015 | Meere | G06Q 20/3274 |
| | | | 705/17 |
| 2016/0182274 A1* | 6/2016 | Kiesekamp | H04L 43/045 |
| | | | 709/224 |
| 2018/0075138 A1* | 3/2018 | Perram | G06F 16/93 |
| 2018/0137504 A1* | 5/2018 | Goldenberg | G06Q 20/0855 |
| 2019/0057454 A1* | 2/2019 | Komenda | H04L 9/3242 |
| 2019/0066089 A1* | 2/2019 | Miryala | G06Q 20/3274 |
| 2020/0118110 A1* | 4/2020 | Coverstone | G06Q 20/401 |

\* cited by examiner

SYSTEMS AND METHODS FOR ANONYMIZING TRANSACTION INFORMATION

CROSS REFERENCE TO RELATED APPLICATIONS

This application claims benefit of U.S. Provisional Application Ser. No. 62/811,394, filed Feb. 27, 2019, entitled "SYSTEMS AND METHODS FOR ANONYMIZING TRANSACTION INFORMATION," which is hereby incorporated by reference in its entirety for all purposes.

BACKGROUND

The present disclosure relates generally to anonymizing data that can be transmitted to facilitate various operations. More specifically, the present disclosure relates to providing a limited amount of information to prevent sensitive information from being provided to others.

Keeping certain types of information confidential helps transactions between parties remain secure from identity theft, hacking opportunities, and the like. For example, when test driving a vehicle, providing a copy of an individual's car insurance may include information that is unrelated to securing the verification of insurance held by the individual. Instead, information related to the individual's residential address, which may not be relevant to the ability of the individual to test drive a vehicle, may be listed on the individual's insurance card and provided to a car dealership. It is now recognized improved systems and methods for anonymizing information provided in certain transactions limits the likelihood of data being compromised.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a transaction identification system. The transaction identification system may include at least one processor that receives a request for identification information associated with a user of the first computing device, such that the request is received from the second computing device. The at least one processor may then receive information regarding an entity associated with the second computing device, retrieve data comprising the identification information from a storage component, generate additional data comprising a portion of the identification information based on the information regarding the entity, and send the additional data to the second computing device.

In another embodiment, a method may include receiving, via a processor, a request for information associated with a user, such that the request is received from a computing device and includes a reason for the information. The method may also involve retrieving data having the information from a storage component and generating a machine-readable image representative of a portion of the information based on the reason. The method may then include sending the machine-readable image to the computing device.

In yet another embodiment, a non-transitory computer-readable medium may include computer-executable instructions that, when executed, are configured to cause a processor to receive a request for identification information associated with a user, such that the request is received from a computing device. The processor may then receive information regarding a requester associated with the computing device, determine a reason for the request based on the information, and retrieve data comprising the identification information from a storage component. The processor may also generate a machine-readable image representative of a portion of the information based on the reason and send the machine-readable image to the computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As organizations work to keep client information, supplier information, employee information, and other personal information confidential, computing systems may be designed to censor or anonymize data provided by the organizations to other organizations or individuals. That is, as security threats related to identity theft, hacking, and the like remain present, the present embodiments disclosed herein may assist organizations and individuals to prevent the distribution of sensitive information when the respective information is not needed for a particular transaction. Additional details with regard to anonymizing information provided in a transaction and the like will be discussed below with reference to FIGS. 1-5.

Figure 1:
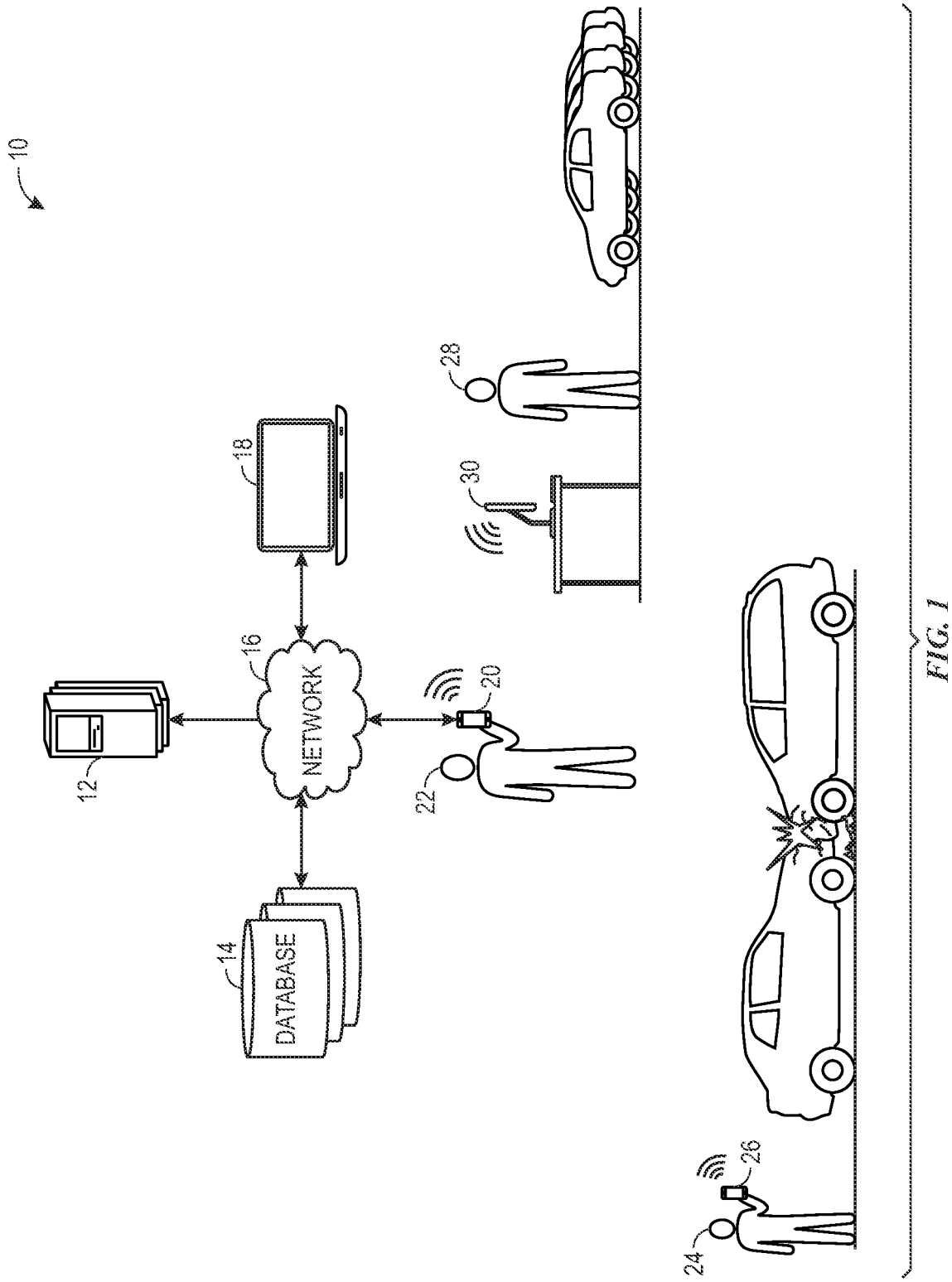
FIG. 1 illustrates a block diagram of a transaction network that includes a number of devices communicatively coupled to a network, in accordance with embodiments described herein.
Figure 2:
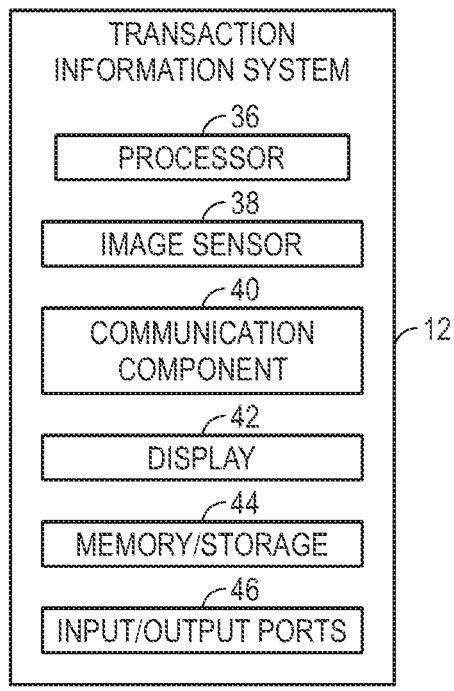
FIG. 2 illustrates a block diagram of a transaction information system communicatively coupled to the transaction network of FIG. 1, in accordance with embodiments described herein.

By way of introduction, FIG. 1 is a block diagram of a transaction network 10 that includes a transaction information system 12, one or more databases 14, a network 16, a computing device 18, a mobile computing device 20, and the like. Although the transaction information system 12 is illustrated as being coupled to the various components depicted in FIG. 1, it should be noted that the transaction information system 12 may be communicatively coupled to a variety of data sources that may assist the transaction information system 12 in performing the embodiments described herein. The transaction information system 12 may include any suitable computer device, such as a general-purpose personal computer, a laptop computer, a tablet computer, a mobile computer, a smart phone device, a server, a cloud-computing system, and the like that is configured in accordance with present embodiments. Additional details with regard to example components that may be part of the transaction information system 12 is described below with reference to FIG. 2.

In certain embodiments, the transaction information system 12 may receive requests for data or documents from individuals via the mobile computing device 20, from organizations via the computing device 18, or from any entity via some suitable computing device. The request for data may provide some metadata or indication with regard to a reason or purpose for the request, an identity of the requester, or the like. Based on the received information, the transaction information system 12 may query the databases 14 or other storage component for the requested data. After retrieving the requested data, the transaction information system 12 may analyze the requested data to determine whether any extra or additional information is provided with the requested data that may not be relevant to the purposes of the requester. As such, the transaction information system 12 may censor or anonymize the irrelevant information, such that the transaction information system 12 provides modified data that includes just the relevant information for the requester. In this way, the requester receives the information that he may use to perform his respective task, while the owner of the data minimizes risk of exposing information that may be used in ways that may be undesirable to the owner.

With the foregoing in mind, the transaction information system 12 may be communicatively coupled to a number of components to perform its respective operations. For example, the transaction information system 12 may be communicatively coupled to the databases 14, the computing devices 18, the mobile computing devices 20, and the like. The databases 14 may include any suitable database that may collect or store information concerning an individual, an organization, or the like. In some embodiments, the databases 14 may include account information related to a number of accounts within one or more financial institutions. The account information may include one or more balances for one or more accounts associated with a respective user, a credit limit for the respective user, a debt-to-asset ratio for the respective user, a risk profile for the respective user, and the like. The risk profile for a user may provide an indication with regard to a level of investment risk or aggressiveness that the corresponding user may have predefined to the financial institution. The account data may also include additional information for the user, such as an age, address, occupation, salary level, income, and other information that may be useful to determine a risk level for a user. In some embodiments, the risk level for a user may be determined based on an amount of income, an amount of savings, an age (e.g., with respect to a desired retirement age), and the like.

In addition to the information listed above for the account data, the databases 14 may also include a collection of documents or information that are related to a number of individuals, account holders, or the like. By way of example, the database 14 may include a collection of documents regarding insurance policies held for various pieces of property owned or leased by an individual, an organization, or the like. As such, the database 14 may provide documents or images that verify that an individual has an insurance policy for an automobile, home, or other property.

Keeping the foregoing in mind, the transaction information system 12 may assist users in a number of scenarios. For example, referring to FIG. 1, a user 22 may be involved in an automobile crash or incident with a driver 24. In this situation, the user 22 and the driver 24 may wish to exchange insurance information to ensure that the appropriate insurance company pays for the respective damage. However, traditional methods for exchanging insurance information by taking a photograph of an insurance card associated with the user 22 and the driver 24 may provide irrelevant information (e.g., address) to each other. As such, in some embodiments, the user 22 may send a request to the transaction information system 12 for insurance policy information that can be provided to the driver 24. The transaction information system 12 may generate an indication of the relevant insurance information for the driver 24 and send the indication to the mobile computing device 20 associated with the user 22. The indication may then be shared by the user 22 to the mobile device 26 associated with the driver 24 via the network 16 or any other suitable communication link. In some embodiments, the indication sent to the mobile computing device 20 may be a machine-readable image or a token that may be encrypted in a manner that a program stored on the mobile computing device 20 may be equipped to acquire the relevant information therefrom. The indication may also include other data acquired by the transaction information system 12, such as a current location (e.g., via sensors), a date, a time, weather conditions, traffic conditions, and the like. The information may be accessible to the transaction information system 12 via sensors or via applications accessible via a network or the like. In some cases, the applications may be associated with the organization providing the indication.

In another example, the user 22 may seek to test drive an automobile at a car dealership or the like. In this case, a dealer 28 may request for the indication of the relevant insurance information for the user 22 from the transaction information system 12. In some embodiments, the user 22 may approve the request from the dealer 28 via the mobile device 20. The transaction information system 12 may then provide the indication to the computing device 30 associated with the dealer 28.

To perform one or more operations described herein, the transaction information system 12 may include various types of components that may assist the transaction information system 12 in performing the operations described below. For example, the transaction information system 12 may include a processor 36, one or more image sensors 38, a communication component 40, a display 42, memory/storage 44, an input/output (I/O) port 46, and the like.

The processor 36 may be any type of computer processor or microprocessor capable of executing computer-executable code. The processor 36 may also include multiple processors that may perform the operations described below. The image sensor 38 may be a sensor capable of acquiring image data surrounding (e.g., environment) the transaction information system 12. As such, the image sensor 48 may be a camera or other suitable image capturing device (e.g., scanner).

The communication component 40 may be a wireless or wired communication component that may facilitate communication between the transaction information system 12, the databases 14, and various other computing systems via the network 16, the Internet, or the like. The display 42 may depict image data acquired by the image sensor 38 and visualizations associated with software or executable code being processed by the processor 36. In one embodiment, the display 42 may be a touch display capable of receiving inputs from a user of the transaction information system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the transaction information system 12.

The memory and the storage 44 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. As used herein, applications may include any suitable computer software or program that may be installed onto the transaction information system 12 and executed by the processor 36. The memory and the storage 44 may represent non-transitory computer-readable media (e.g., any suitable form of memory or storage) that may store the processor-executable code used by the processor 36 to perform various techniques described herein. It should be noted that non-transitory merely indicates that the media is tangible and not a signal. The I/O ports 46 may be interfaces that may couple to other peripheral components such as input devices (e.g., keyboard, mouse), sensors, input/output (I/O) modules, and the like.

In addition to the transaction information system 12, the mobile computing devices 20 and 26, the computing devices 18 and 30, as well as other suitable computing devices described herein may include the components described above for the transaction information system 12. It should be noted that the components described above with regard to the transaction information system 12 are exemplary components and the transaction information system 12 may include additional or fewer components than shown.

With the foregoing in mind, the present embodiments described herein may be utilized to facilitate provision of account information for a particular transaction in a manner that prevents the information from being utilized in a different transaction. For example, a bank account number may be requested by an organization but it may be preferable to the account holder to keep the bank account number private, while maintaining the ability to provide the necessary information to the organization. In another example, proof of insurance may be requested by an organization to test drive a car, such that the organization can verify that the test driver has a sufficient amount of insurance. In any case, the information to be provided to a requester may just need a portion of the information requested. As such, the presently disclosed techniques include certain methods for modifying requested data to facilitate the needs of the requester, while protecting the information of the information provider. In addition, the presently disclosed techniques may assist users ensure that personal data provided to others may be regulated or distributed in controlled fashion by a trusted source, thereby providing additional security in the dissemination of their respective information.

Figure 3:
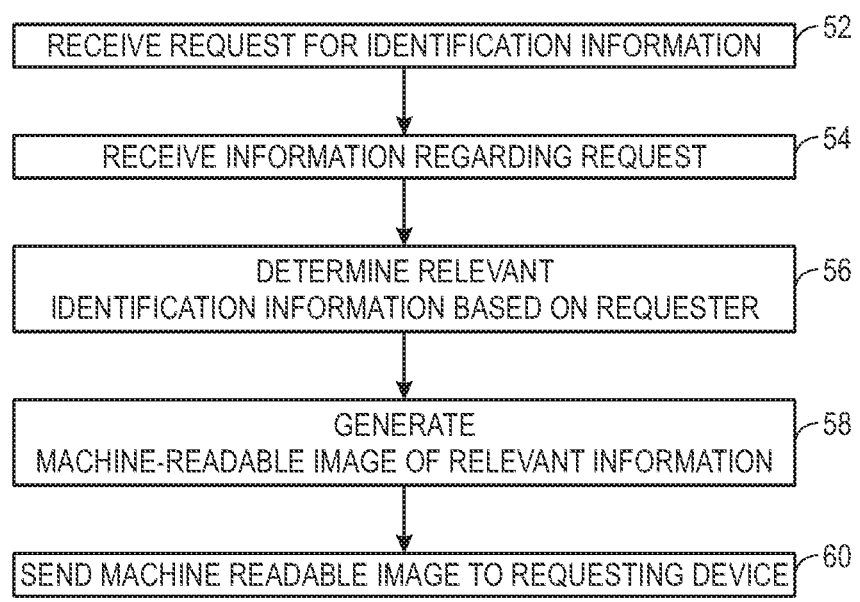
FIG. 3 illustrates a flow chart of a method for transmitting machine readable image data with anonymized information using the transaction information system of FIG. 2, in accordance with embodiments described herein.

FIG. 3 illustrates an example method 50 that may be employed by the transaction information system 12 to assist a user in providing a limited amount of information to a requesting organization or entity. Before proceeding, it should be noted that the method 50 described below is described as being performed by the transaction information system 12, but the method 50 may be performed by other suitable computing devices. In addition, although the method 50 is described in a particular order, it should be understood that the method 50 may be performed in any suitable order.

Referring now to FIG. 3, at block 52, the transaction information system 12 may receive a request for identification information to perform a certain task. The request may be sent by the computing device 18, the mobile computing device 20, or any other suitable computing device. The transaction information system 12 may have access to the identification information and may also have permission from an account holder or user associated with the identification information before proceeding further in the method 50.

At block 54, the transaction information system 12 may receive information regarding the requester. In some embodiments, the transaction information system 12 may send information requests to the requester to solicit a reason or purpose for the information requested at block 52. The request for information received at block 52 may also include metadata or other data related to the requester. The metadata may include an indication of the identity (e.g., Internet protocol address, business name, individual name)

of the requester, a purpose for the request, a transaction type associated with the request, or the like.

In some cases, the information regarding the requester may dictate the corresponding information provided to the requester. For example, if the information regarding the requester indicates that the requester is a trusted source. A list of trusted sources may be predefined by the transaction information system, the requester of the information, or the user associated with the information. In some embodiments, a trusted source may also be gauged based on whether the requester is an individual, a company, a company listed as a trusted source, a publicly traded company, a company listed on a consumer list (e.g., Better Business Bureau) or the like.

Based on the information related to the requester, the transaction information system 12 may, at block 56, determine the relevant identification information that the requester may be seeking. In some embodiments, the relevant information may be determine based on a transaction type associated with the request. For instance, if the transaction type associated with the request is related to a car rental or car test driver, the transaction information system 12 may determine that the requester of the identification information is seeking to determine an amount of insurance coverage associated with the user that is requesting to access the car. As such, the transaction information system 12 may determine the relevant information associated with the user's insurance coverage that may be part of the identification information accessible to the transaction information system 12. That is, the identification information may be stored in the databases 14 or other suitable storage component. After receiving the request for identification information at block 52, the transaction information system 12 may query the database 14 to retrieve the identification information. However, before proceeding to block 58, the transaction information system 12 may determine the relevant portion of the retrieved identification information that may be sought after by the requester based on the information regarding the requester received at block 54. In some embodiments, based on a level or category of trust associated with the requester, the transactional information system 12 may identify a different amount of identification information that may be categorized as relevant.

In addition to determining the relevant information based on the transaction type, the transaction information system 12 may receive a list of criteria or items that correspond to the relevant information that may be of interest to a requester prior to performing the method 50. That is, different organizations or individuals may provide a list of items or datasets that may be of interest to the organization or individual when performing the method 50. This list may be stored in a memory or storage that may be accessible to the transaction information system 12 during the performance of the method 50.

In some embodiments, the transaction information system 12 may employ a machine learning algorithm to develop a model for expected relevant information for various organizations or individuals. By way of example, a particular individual who owns an Internet-based business may request a confirmation for the user to have a sufficient amount of funds to perform a certain transaction. This individual may repeatedly request the same information from the transaction information system 12 for each different transaction that he performs. As such, after the transaction information system 12 detects that the particular individual requests the same relevant information a threshold number of times, the transaction information system 12 may generate and store an indication of the relevant information associated with the particular individual in the suitable storage, such that the transaction information system 12 may automatically determine the relevant identification information at block 56 without soliciting information from the individual requesting the identification information.

Referring back to FIG. 3, at block 58, the transaction information system 12 may generate a machine-readable image of the relevant information. The machine-readable image may be a barcode, Quick Response (QR) code, or other suitable machine scannable image that may enable a computing device to retrieve information after scanning the code. The machine-readable code may be thus be translated by another computing device (e.g., mobile computing device 20) to produce the relevant information determined at block 56. In some embodiments, the translated data may include a list of the relevant information depicted in text. Alternatively, the translated data may direct the other computing device to a website or network address that provides an indication of the relevant information determined at block 54. In some embodiments, the machine-readable image may include a hash value, encrypted information, or other data that may encoded into the image and used to confirm the authenticity of the image.

After generating the machine-readable image, at block 60, the transaction information system 12 may transmit the machine-readable image to the computing device associated with sending the request for the identification information at block 52. In some embodiments, the machine-readable image may be generated to provide the relevant information to just the requester of the identification information. That is, for example, the machine-readable image may be generated based on an encryption key provided to the transaction information system 12 as part of the information regarding the requester provided at block 54. As such, the machine-readable image may be decrypted by the requester of the identification information and may be useless to others who may gain access to the machine-readable image.

In addition to generating a machine-readable image, in some embodiments, the transaction information system 12 may retrieve the identification information requested by an organization or entity and modify an associated document to include just the relevant information. For example, the transaction information system 12 may access an image of an insurance liability card associated with an individual and may censor portions of the image, such that just the relevant information is provided in the modified image.

Figure 4:
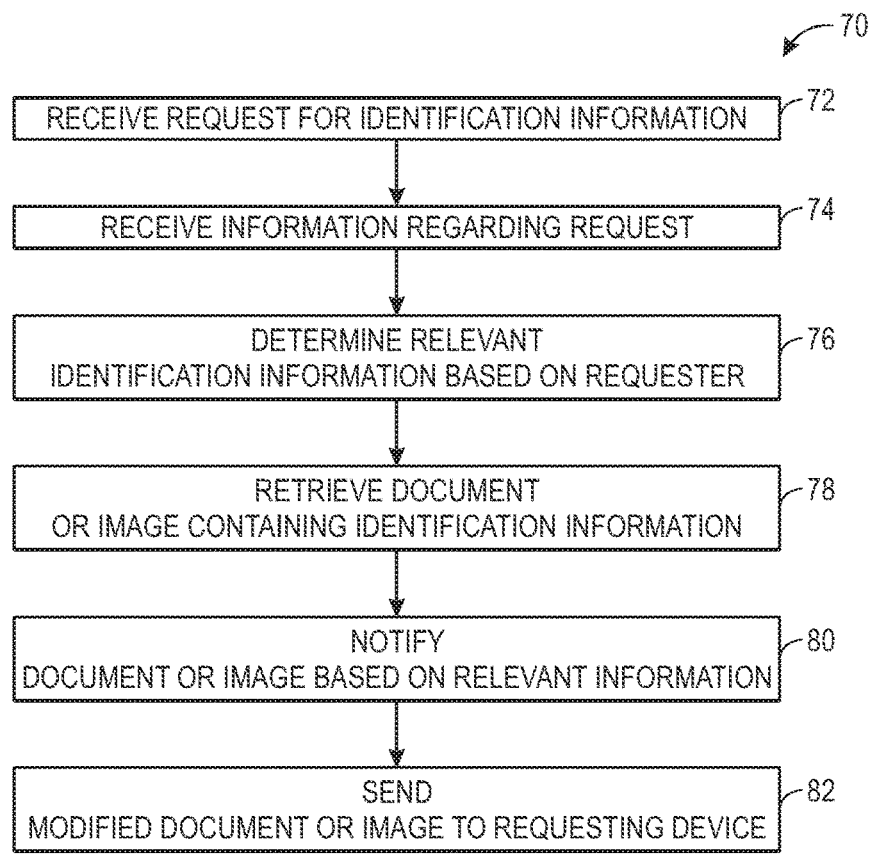
FIG. 4 illustrates a flow chart of a method for transmitting modified image data with anonymized information using the transaction information system of FIG. 2, in accordance with embodiments described herein.

With this in mind, FIG. 4 illustrates an example method 50 that may be employed by the transaction information system 12 to assist a user in providing a limited amount of information to a requesting organization or entity via a modified document or image. Before proceeding, it should be noted that the method 70 described below is described as being performed by the transaction information system 12, but the method 70 may be performed by other suitable computing devices. In addition, although the method 70 is described in a particular order, it should be understood that the method 70 may be performed in any suitable order.

Referring to FIG. 4, blocks 72, 74, and 76 may include the same operations described above with reference to blocks 52, 54, and 56 in FIG. 3. After determining the relevant identification information at block 76, the transaction information system 12 may retrieve a document or image that includes the identification information requested at block 72. The document or image may include a collection of information related to the information sought after by the requester sending the request for identification information at block 72. The document or image may include a driver's license, an identification card, a health insurance card, an automobile insurance card, a home owner's insurance policy document, a flood insurance policy document, or the like.

In some embodiments, a collection of documents may be stored in the databases 14 and may be searchable or queried based on the information regarding the requester received at block 74, the individual or organization associated with the identification information, or the like. As such, when retrieving the document or image data containing the identification information, the transaction information system 12 may search the databases 14 or other storage component to identify the document or image that includes the identification information. It should be noted that the request received at block 72 may specify a particular document or image that is expected to include the identification information, such as the specific documents mentioned above.

After retrieving the document or image containing the identification information, the transaction information system 12 may, at block 80, modify the document or image based on the relevant information determined at block 76. As mentioned above, in some embodiments, the transaction information system 12 determine the purpose of the request for the identification information based on the data received regarding the requester at block 74. In addition, as discussed above, the transaction information system 12 may use certain machine learning algorithms to deduce the expected relevant information associated with a particular requester, a particular type (e.g., similar industry, product) of requester, or the like.

When modifying the document or image, the transaction information system 12 may identify the portions of the document or image that includes the relevant information. The transaction information system 12 may then censor, distort, or cover the portions of the document or image that do not include the relevant information. For example, in an automobile insurance card, the transaction information system 12 may censor the address field and vehicle identification number that is depicted on the insurance card, such that the modified document or image may just include the name of the insured and a policy number associated with the insured driver. This may include blurring or blocking images (e.g., photographs of individuals).

At block 82, the transaction information system 12 may send the modified document or image to the computing device that sent the request for the identification information at block 72. Although the computing device that sends the request for the identification information may be a third party between the requester of the identification information and the individual associated with the identification information, the requester of the information may prefer that the third party or another entity verify that the modified document or image or machine-readable image is authentic.

Figure 5:
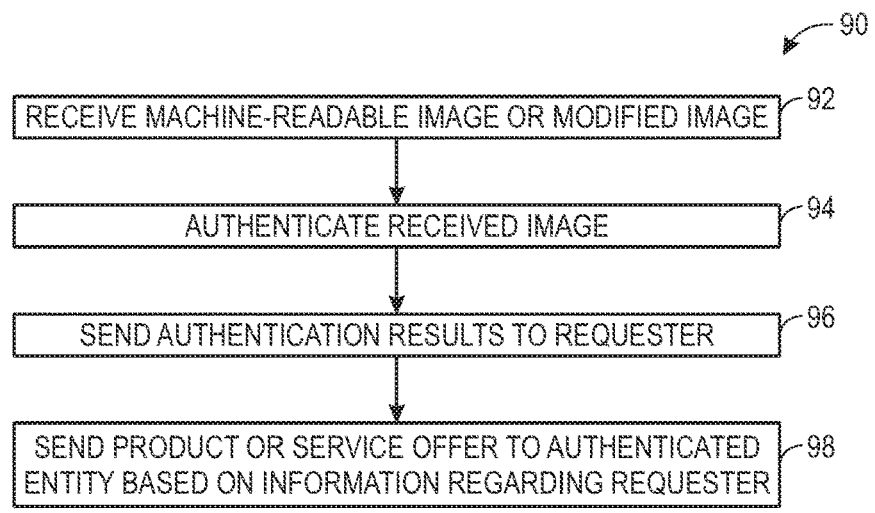
FIG. 5 illustrates a flow chart of a method for authenticating image data associated with anonymized data, in accordance with embodiments described herein.

With this in mind, FIG. 5 illustrates a method 90 for authenticating data that includes the identification information or the relevant identification information described above. In some embodiments, an authenticating organization or entity may receive the modified image data, modified document, or machine-readable image generated according to the methods 50 and 70 described above and may authenticate the respective data based on metadata, an authentication algorithm, or the like. As such, a central institution (e.g., third party, original party) may serve as a trusted entity to verify the interactions between the users of the transaction network 10.

Before proceeding with the description of the method 90, it should be noted that the method 90 described below is described as being performed by an authentication system, which may include similar components as described above with reference to the transaction information system 12. In addition, the method 90 may be performed by other suitable computing devices. Moreover, although the method 90 is described in a particular order, it should be understood that the method 90 may be performed in any suitable order. In some embodiments, the authentication system that performs the method 90 may be different from the transaction information system 12 that performs the methods 50 or 70. As such, the entity that provides the authentication services related to the method 90 may be free from influence and more likely to be trusted by users.

Referring now to FIG. 5, at block 92, the authentication system may receive the machine-readable image or modified image generated according to the methods 50 and 70 described above. The machine-readable image or modified image may be received from the computing device that receives the respective data.

At block 94, the authentication system may authenticate the received data. In some embodiments, when generating the machine-readable image or the modified image, the transaction information system 12 generating this data may embed a symbol, code, or some other suitable marking that may be used to determine whether the generated data is authentic. For example, the authentication system performing the method 90 may have access to a decryption key or algorithm that may be applied to the marking embedded in the machine-readable image or the modified image. After applying the decryption key or algorithm to the marking, the authentication system may determine whether an expected output is received. The expected output may include a predetermined phrase or code that, if received, verifies that the machine-readable image or the modified image is authentically generated by a verified party.

In some embodiments, when authenticating the received data, the authentication system may send a message or notification to the user associated with the relevant information provided via the methods 50 and 70. The message or notification may request a confirmation that the user intends to share the relevant information to the requesting party. The message or notification may be sent to two or more components associated with the user to enable a multiple factor authentication system.

At block 96, the authentication system may send the results of the authentication to the computing device associated with sending the request for the authentication. In some embodiments, the authentication system may, at block 98, send product or service offers to the authenticated entity or individual based on the information regarding the requester described above. That is, the authentication system may receive the information regarding the requester described above with respect to block 54 of the method 50 and determine products or services that may be beneficial to the entity or individual being authenticated based on the reason or purpose for the requester receiving the identification information.

By way of example, referring back to FIG. 1, if the user 22 is part of a car accident with the driver 24, the driver 24 may authenticate the insurance information regarding the user 22 received from the transaction information system 12 using the authentication system described above in FIG. 5. After authenticating the identification information (or relevant identification information), the authentication system may send a notification to the mobile device 20 of the user 22 to initiate a claim for his insurance policy. In some embodiments, the authentication system may coordinate the operations for the claim or may send a command to the transaction information system 12 or other suitable computing device to coordinate the operations for the claim. In any case, the authentication system may use the purpose or reason that the requesting party is seeking the identification information of a user to determine what products or services may be useful to the entity or individual providing the identification information.

In another example, the authentication system may determine that the identification information is being retrieved to test drive a car from the dealer 28. As such, the authentication system may send the user providing the identification information an offer for an automobile loan or a quote for an insurance policy on a new vehicle that the user may be test driving.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a first computing device comprising at least one processor configured to:
receive a request for identification information associated with a user of the first computing device, wherein the request is received from a second computing device;
receive information regarding an entity associated with the second computing device;
identify a portion of the identification information based on the entity and a model stored in a storage component, wherein the model comprises an association between the portion of the identification information and the entity, and wherein the model is generated based on the entity requesting the portion of the identification information more than a threshold number of times, and the portion of the identification information excludes an additional portion of the identification information deemed irrelevant to the entity;
retrieve data comprising the identification information from the storage component;
modify the data to include the portion of the identification information;
generate a machine-readable image representative of the portion of the identification information; and
send the machine-readable image to the second computing device.

2. The system of claim 1, wherein the second computing device is configured to retrieve the portion of the identification information from the machine-readable image.

3. The system of claim 1, wherein the data comprises a document comprising the identification information, and wherein the machine-readable comprises a portion of the document.

4. The system of claim 3, wherein the at least one processor is configured to modify the data by censoring an additional portion of the identification information.

5. The system of claim 1, wherein the at least one processor is configured to send an offer for a product or a service to the first computing device based on the information regarding the entity.

6. The system of claim 1, wherein the second computing device is configured to send an additional request to an additional computing device, wherein the additional request corresponds to authenticating the machine-readable image, and wherein the additional computing device is configured to authenticate the machine-readable image based on a feature embedded in the machine-readable image.

7. The system of claim 6, wherein the additional computing device is different from the first computing system.

8. The system of claim 6, wherein the at least one processor is configured to embed the feature into the machine-readable image.

9. A method, comprising:
receiving, via a processor, a request for information associated with a user, wherein the request is received from a computing device and comprises a reason for the information and an entity associated with the computing device;
identifying, via the processor, a portion of the information based on the entity and a model stored in one or more storage components, wherein the model comprises an association between the portion of the information and the entity, and wherein the model is generated based on the entity requesting the portion of the information more than a threshold number of times, and the portion of the identification information excludes an additional portion of the identification information deemed irrelevant to the entity;
retrieving, via the processor, data comprising the information from the storage component;
modifying, via the processor, the data to include a portion of the identification information;
generating, via the processor, a machine-readable image representative of the portion of the information; and
sending, via the processor, the machine-readable image to the computing device.

10. The method of claim 9, wherein the information is associated with an insurance coverage associated with the user.

11. The method of claim 9, comprising encrypting the portion of the information into the machine-readable image.

12. The method of claim 9, comprising:
retrieving location information associated with the processor; and
generating the machine-readable image based on the location information.

13. The method of claim 9, comprising sending an additional request for the reason to the computing device in response to receiving the request.

14. The method of claim 9, wherein the request comprises metadata associated with the computing device.

15. The method of claim 14, wherein the metadata comprises an identity of a requester associated with the computing device.

16. A non-transitory computer-readable medium comprising computer-executable instructions that, when executed, are configured to cause a processor to:
receive a request for identification information associated with a user, wherein the request is received from a computing device;
receive information regarding a requester associated with the computing device;
identify a portion of the identification information based on the requester and a model stored in a storage component wherein the model comprises an association between the portion of the identification information and the entity, and wherein the model is generated based on the entity requesting the portion of the identification information more than a threshold number of times, and the portion of the identification information excludes an additional portion of the identification information deemed irrelevant to the entity;

retrieve data comprising the identification information from a storage component;

generate a machine-readable image representative of the portion of the information; and send the machine-readable image to the computing device.

17. The non-transitory computer-readable medium of claim 16, wherein the information is indicative of an Internet protocol address, a business name, a individual name, or any combination thereof.

18. The non-transitory computer-readable medium of claim 16, wherein the information is indicative of a purpose for the request, a transaction type associated with the request, or both.

19. The non-transitory computer-readable medium of claim 16, wherein the machine-readable image comprises a barcode or Quick Response (QR) code.

20. The non-transitory computer-readable medium of claim 16, wherein the machine-readable image comprises an additional portion of the information, and wherein the additional portion of the information is censored from view.

* * * * *